Feb. 20, 1940.                J. F. DUBY                2,190,866
                          INDICATING INSTRUMENT
                    Filed May 5, 1937          2 Sheets-Sheet 1
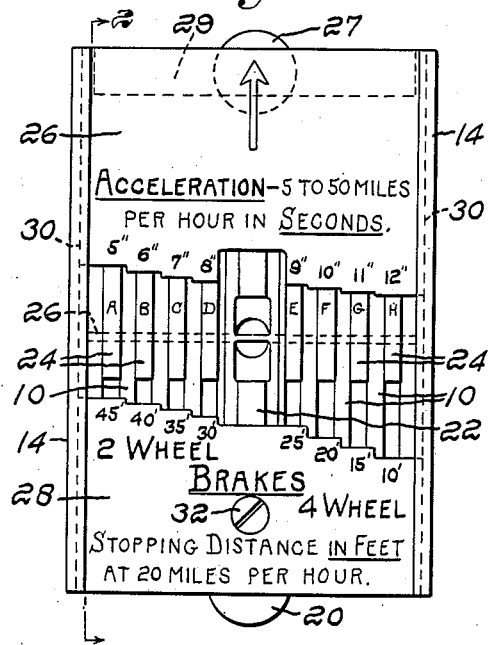
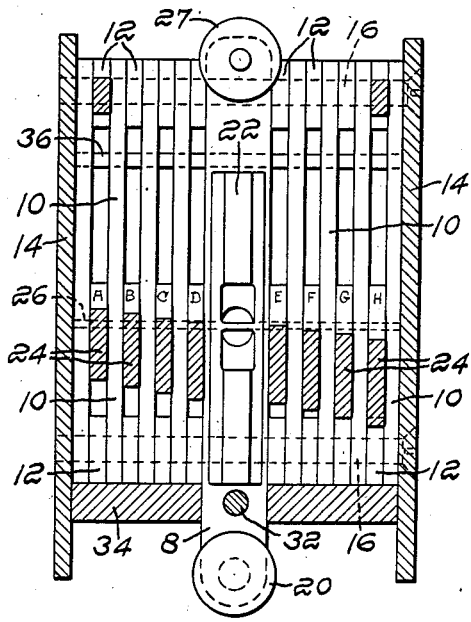
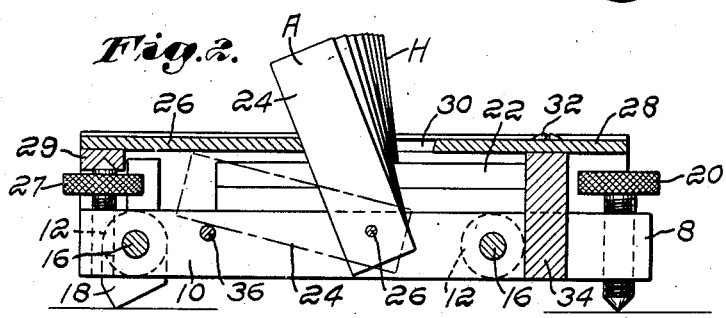
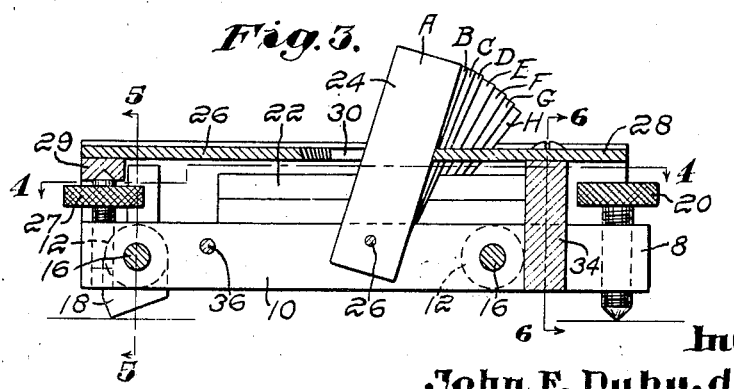
Inventor,
John F. Duby, dec'd,
By Mary Agnes Duby, Admx.

Feb. 20, 1940.     J. F. DUBY     2,190,866
INDICATING INSTRUMENT
Filed May 5, 1937     2 Sheets-Sheet 2
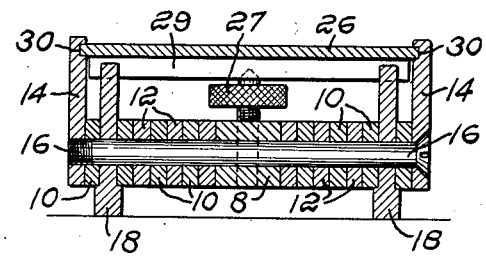
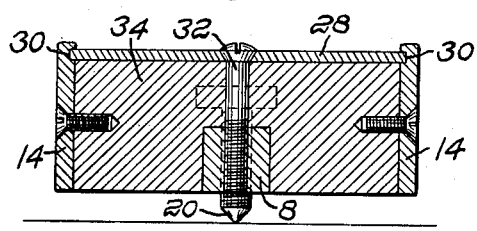
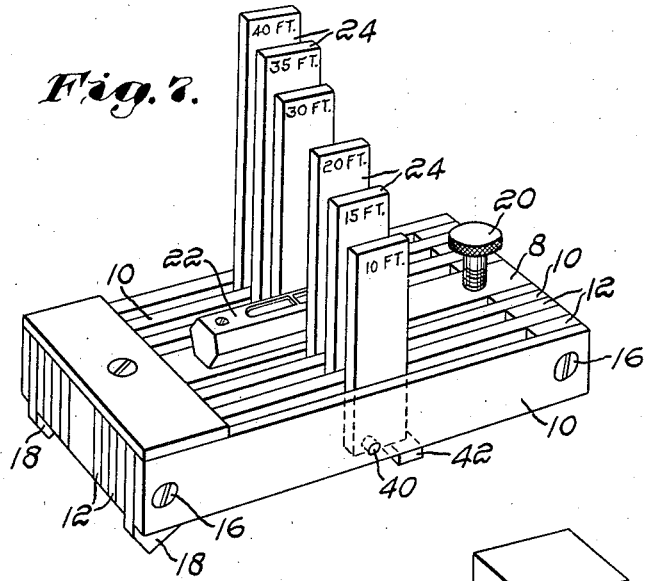
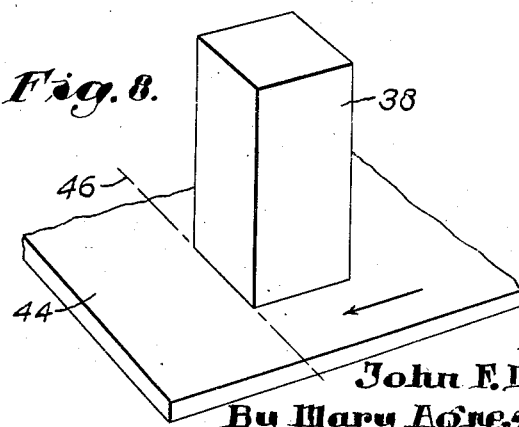
Inventor:
John F. Duby, dec'd
By Mary Agnes Duby
Admr.

Patented Feb. 20, 1940

2,190,866

UNITED STATES PATENT OFFICE 2,190,866

INDICATING INSTRUMENT

John F. Duby, deceased, late of Dorchester, Mass., by Mary Agnes Duby, administratrix, Dorchester, Mass.

Application May 5, 1937, Serial No. 140,867

2 Claims. (Cl. 264—1)

This invention relates to an instrument for indicating the rate of acceleration of a vehicle when motive power is applied thereto and also for indicating the rate of deceleration thereof upon application of braking mechanism. In the conventional type of instrument, wherein a pendulum is caused to move by a change in the velocity of a vehicle, it is usually found necessary to employ some form of damper in order to prevent oscillating thereof. An oil or air damper usually involves additional cost to manufacture and maintain; furthermore the damper introduces a lagging action which prevents a quick response of the element to the change in vehicle velocity.

In this improved instrument the necessity of any damping devices or springs is avoided. The testing element is permitted to move freely when it is once set in motion. By positioning the testing element in a predetermined degree of stability, a given change in the velocity of a vehicle will cause inertia to act upon the element, overcome its degree of stability and disturb its original position. The degree of stability will be greatest when the element is at rest in its normal testing position, therefore, any force which is sufficient to move the element from this position will cause it to topple over and give an indication. The period of time during which the force must act is reduced to the minimum by employing substantially short testing elements.

It is preferable to adopt a standard unit of measurement for each test, as for example, acceleration may be indicated in seconds required to accelerate from a speed of five miles per hour to one of fifty miles per hour and deceleration may be indicated by the distance, in feet, required to bring the vehicle to a stop from a speed of twenty miles per hour.

One of the objects of this invention is to provide an instrument of this type so small and compact that it may be carried in the pocket when not in use. Another object is to provide a device with few moving parts which require minimum machining operations to give an accurate reading. Other features of the invention relate to novel combination of parts and the design thereof to speed up the assembling operations and thereby reduce the cost of manufacture.

In the drawings:

Figure 1 is a top plan view of this improved instrument, the testing elements being shown in non-operative position.

Fig. 2 is a longitudinal section thereof substantially on line 2—2 of Fig. 1 but showing the testing elements in position for an acceleration test.

Fig. 3 is a view similar to Fig. 2, but showing the elements in position for a deceleration test.

Fig. 4 is a plan section on line 4—4 of Fig. 3.

Figs. 5 and 6 are detail transverse sections taken on lines 5—5 and 6—6, respectively, of Fig. 3; and Fig. 7 represents a modified form of this improved instrument.

Fig. 8 represents the principle involved in this invention.

Referring to Figs. 4, 5 and 6, the instrument includes a base comprising a central bar member 8, a plurality of thinner bars 10 suitably positioned by spacers 12, and side wall members 14. The above mentioned members are preferably assembled as shown in Fig. 4 and may be connected to form a unit by means of elongated screws 16 adapted for threaded engagement with one of the side walls, as shown in Fig. 5.

A pair of instrument supporting feet 18 may be provided at one end of the frame by introducing specially constructed spacers at the extreme corners thereof. An adjusting screw 20, threaded into bar 8 at the opposite end of the frame, provides means for leveling the instrument prior to making a test. A spirit level 22 may be suitably mounted on bar 8 to indicate when the instrument is positioned substantially level longitudinally thereof.

A series of indicating bars 24, freely mounted on a common pivot shaft 26, comprise the only moving parts of the instrument during a test; they are referred to by letters A to H inclusive and are preferably of the same shape and size but inclined at different angles away from horizontal, each bar being inclined at an angle which will permit the effect of inertia to overcome the effect of gravity at a given rate of change in the velocity of its center of moments, see Figs. 2 and 3.

In order that each bar may be readily and accurately set at its proper angle to give a desired indication cover plates 26 and 28 are provided which may be connected to the side walls 14 in any suitable manner as by grooves 30, see Fig. 5. The latter plate, 28, is preferably fixed in the desired locations, with respect to the instrument frame, by means of an elongated screw 32 which may have a threaded connection to bar 8 as shown in Fig. 6. And end closure and spacer bar 34 is positioned between the plate 28, bar 8 and side walls 14 to insure rigidity and also to provide additional weight at that end of the instrument to prevent any possibility of disturbing the levelled position thereof during a deceleration test.

The cover plate 26 may be slidably mounted in the grooves 30 and provided with a suitable locking device such as a thumb screw 27, threaded into bar 8, and provided at its upper end with a pointed end adapted to engage a depression in a cross bar 29, said bar being suitably attached to the under side of plate 26 at the outer edge thereof. Rotation of the screw 27 in one direction will release the pointed end from contact with bar 29 and permit the cover to be moved outwardly to confine or release the bars 24, as desired. The cover may then be replaced and reverse rotation of the screw will engage the above mentioned parts and position the cover plate properly to perform an additional function to be presently described.

The inner edges of the cover plates may be step-cut, as shown in Fig. 1, to insure proper angular setting of bars 24 prior to making a test, plate 26 being utilized for acceleration and plate 28 being designed for deceleration. The latter plate is preferably adapted to distinguish between two and four wheel brakes for convenience and each plate may be suitably marked, as shown, the markings on plate 26 representing seconds and those on plate 28 representing feet.

The operation of this improved instrument when testing acceleration is as follows:

It may be placed on its supporting feet upon a floor or other convenient part of a vehicle to be tested, and the screw 20 adjusted to set the instrument substantially level, care being taken also to note that the end of the instrument, represented by plate 26, is pointing forward.

All of the bars 24 should then be manually tipped over against their respective stops, for example, bar A will rest against the step-cut marked 5 seconds, bar B will rest against the step-cut marked 6 seconds, and so on. The vehicle should then be accelerated to a speed of five miles per hour, care being taken not to disturb any of the settings already made; the full motive power of the vehicle may then be applied thereto and the rate of acceleration will be indicated by the various bars as they are caused to move beyond a vertical plane and tip over to their respective stops presented by plate 28. Let us assume that bars H, G and F were tipped over in the order named; the operator will know at a glance that the rate of acceleration was five to fifty miles per hour in ten seconds. A stop-watch is not required and no definite speed need be attained for a test with this improved instrument.

In order to make a brake, or deceleration test, all of the bars 24 should be manually moved to their respective stops presented by plate 28, for example, bar A would then be against the step-cut marked 45 feet, bar B against step-cut marked 40 feet, and so on. The vehicle may then be driven forward at any convenient speed and the brakes applied. Let us assume that bars A to F inclusive were tipped over against plate 28. The last bar to tip over, viz., bar F indicates that the deceleration rate was, at least, equivalent to a twenty foot stop from a speed of twenty miles per hour.

It will be evident that each bar constitutes a complete testing element for determining whether the rate of change in the velocity of a vehicle or object is above or below a given rate; for example, if the rate of change is below the given rate, the bar will remain as normally set, but if the rate be above the given rate then its predetermined degree of stability will yield to inertia and the bar will topple over and so indicate. By employing a plurality of bars, each having a different degree of stability, it is possible to determine the rate of change within certain desired limits.

When the instrument is not in use, the cover 26 may be slid outwardly, permitting bars 24 to swing into the housing and rest on a stop rod 36 suitably mounted in the base. Replacement and locking of the cover will confine the bars in non-operative position, providing a compact instrument which may be made small enough to fit the pocket. Symmetry of parts should be noted, also the absence of machined members and the apparent ease with which the instrument may be assembled.

Fig. 7 represents a modified form of instrument wherein all of the testing elements may be positioned at the same angle away from horizontal although the degree of stability with respect to each element varies because they are of different heights. The common pivot shaft 40 may be positioned a predetermined distance away from the vertical center of gravity of the upstanding bars and the proper heights thereof may be determined by the laws of motion. A cross member 42 serves to position the bars at an angle perpendicular to the frame.

Fig. 8 represents the principle involved in this invention. It will be evident that a fixed pivot shaft is not required and that various methods may be employed to establish a center of moments for each testing element, and for establishing the relative positions of the center of gravity and the center of moments of each element.

It will be noted that in cases where only deceleration tests are required plate 26 can be graduated and so proportioned that the gage may be turned end for end to test deceleration in stopping distances other than those indicated on plate 28. This would make each of the bars 24 adjustable so as to indicate more than one rate of change in velocity. Obviously plate 26 which is slideable could be locked in various positions thereby making it possible to set any one of the bars 24 to any desired degree of stability. Many variations of construction and detail could be resorted to without departing from the spirit and scope of the invention.

What is claimed is:

1. In an indicating instrument of the character described, a base comprising a plurality of associated bars arranged in parallelism, means to connect the bars together as a unit, a pivot shaft supported by said base, an element positioned in each of the spaces between said bars and supported by said shaft, a housing supported by said unit and adapted to confine said elements when not in use, an aperture in said housing, said aperture being so designed as to provide desired angular positioning of the elements when in use, and markings adjacent the aperture cooperating with said elements to signify the rate of change in velocity required to actuate the elements.

2. An indicating instrument comprising a base including a plurality of spacer bars in mutually spaced parallel relation, a pivot rod extending transversely of said bars, a plurality of unitary, rigid indicating elements mounted for free swinging movement on said pivot rod, each of said elements being located between a pair of adjoining spacer bars, stop means carried by said base and cooperating with the rod in supporting said elements in normal, generally upstanding positions wherein the center of gravity of each element is at one side of a vertical plane passing through the axis of said rod, said elements being respectively swingable in response to different predetermined changes in velocity to move through a position of unstable equilibrium to a position wherein the center of gravity of the element is at the opposite side of said vertical plane, each element being constructed and mounted so that throughout the movement of the element its center of gravity follows an arc uniformly spaced from the axis of said rod, said elements also being movable into positions wherein they lie substantially between said spacer rods whereby the instrument may provide a compact assembly for convenient transportation or the like.

M. AGNES DUBY,

*Administratrix of the Estate of John F. Duby, Deceased.*